US005521382A

United States Patent [19]

Tanaka et al.

[11] Patent Number: 5,521,382

[45] Date of Patent: May 28, 1996

[54] MS/MS TYPE MASS ANALYZER

[75] Inventors: Yasufumi Tanaka, Kyoto; Megumi Hirooka, Uji, both of Japan

[73] Assignee: Shimadzu Corporation, Kyoto, Japan

[21] Appl. No.: 391,511

[22] Filed: Feb. 21, 1995

[30] Foreign Application Priority Data

Feb. 24, 1994 [JP] Japan .................................... 6-052999

[51] Int. Cl.[6] ............................ H01J 49/26; B01D 59/44

[52] U.S. Cl. ............................................ 250/292; 250/281

[58] Field of Search .................................... 250/292, 281, 250/296

[56] References Cited

U.S. PATENT DOCUMENTS

| | | | |
|---|---|---|---|
| 4,234,791 | 11/1980 | Enke et al. | 250/281 |
| 4,328,420 | 5/1982 | French | 250/292 |
| 4,329,582 | 5/1982 | French et al. | 250/292 |
| 4,731,523 | 3/1988 | Kestal | 250/292 |
| 5,089,703 | 2/1992 | Schoen et al. | 250/292 |
| 5,248,875 | 9/1993 | Douglas et al. | 250/281 |

*Primary Examiner*—Bruce C. Anderson
*Attorney, Agent, or Firm*—Oliff & Berridge

[57] ABSTRACT

A common frequency source is used for the RF voltage generators of an MS/MS type mass analyzer composed of first, second and third main quadrupole units and two pre-rod quadrupole units provided for the first and third main quadrupole units. Since there arises no discrepancy in the frequency and phase of the RF electric field between the adjacent quadrupole units, the (parent as well as daughter) ions can pass through the quadrupole units smoothly and dispersion of the ions is minimized, which improves the sensitivity of the mass analyzer.

7 Claims, 4 Drawing Sheets

MS/MS TYPE MASS ANALYZER

The present invention relates to MS/MS mass analyzers (or tandem quadrupole mass analyzers) which are useful in analyzing drugs, gases, etc. with high sensitivity.

BACKGROUND OF THE INVENTION

A quadrupole mass analyzer includes a quadrupole unit 80, which is, as shown in FIG. 4, composed of four rod electrodes 81, 82, 83, 84 placed in parallel to and symmetrically around the z axis. A direct current (DC) voltage U and a high frequency (normally a radio frequency RF) alternate current (AC) voltage V·cos(ω·t) are simultaneously applied between a pair of electrodes 81 and 83 placed along the x axis and the other pair of electrodes 82 and 84 placed along the y axis. When ions are introduced into the center of an end of the quadrupole unit 80 while the RF/DC voltage is applied, only ions 88 having a specific mass/electric charge ratio (m/z) according to the values of the voltage U and V can pass through the quadrupole unit 80 but other ions 87 disperse. Thus the quadrupole unit 80 is used as a mass filter by setting appropriate values of the voltage U and V, and the mass of the filtered ions can be scanned by changing the values of U and V.

As shown in FIG. 5, an MS/MS type mass analyzer includes three quadrupole units ($Q_1$, $Q_2$, $Q_3$) placed in line between an ion source 11 and an ion detector 13. An object sample is ionized in the ion source 11 and the ions of various masses are introduced into the first quadrupole unit $Q_1$. The first quadrupole unit $Q_1$ allows ions of a preset mass $M_P$ to pass therethrough and to enter the second quadrupole unit $Q_2$. The second quadrupole unit $Q_2$ is accommodated in a case called collision chamber 12 in which collision gas such as Ar or $N_2$ is contained. The ions 14 that have passed through the first quadrupole unit $Q_1$ (which are then referred to as "parent ions") collide with the collision gas molecules and dissociate into partial ions (which are then referred to as "daughter ions"). The daughter ions 15 thus generated are conveyed by the electric field of the second quadrupole unit $Q_2$ to the third quadrupole unit $Q_3$. The third quadrupole unit $Q_3$ functions similarly to the first quadrupole unit $Q_1$ and allows daughter ions 15 of a preset mass $M_{41}$ to pass therethrough and to enter the ion detector 13.

As described above, a direct current (DC) voltage U and a high frequency (or RF) alternate voltage V·cos(ω·t) are simultaneously applied between two rod electrode pairs in each of the three quadrupole units $Q_1$–$Q_3$. The DC voltage U and the RF voltage V·cos(ω·t) are generated by a driver circuit 86 (FIG. 4). Aside from the driver circuit 86, a bias DC circuit 85 is provided to apply a bias DC voltage between the ion source 11 and the quadrupole unit 80. The bias DC voltage accelerates the ions generated by the ion source 11 to adequately pass the ions through the quadrupole unit and, for the second quadrupole unit $Q_2$ of the MS/MS type mass analyzer, to give the ions enough collision energy to adequately dissociate. The bias DC voltage is applied to each of the three quadrupole units $Q_1$, $Q_2$ and $Q_3$, and, as shown in FIG. 5, the values of the bias DC voltage $V_1$, $V_2$ or $V_3$ depend on purposes of the respective quadrupole units $Q_1$, $Q_2$ and $Q_3$.

A problem in the prior art MS/MS type mass analyzers is that when the frequency of the RF voltage applied to adjacent quadrupole units differs slightly or there is a subtle phase mismatch between them, a beat occurs between them which disturbs and disperses the ions passing through the adjacent quadrupole units. In this case, naturally, lighter ions are influenced more.

SUMMARY OF THE INVENTION

An object of the present invention is to allow as many object ions as possible to pass through the quadrupole units of an MS/MS type mass analyzer and improve the sensitivity of the mass analyzer.

In order to achieve the above and other objects, an MS/MS type mass analyzer according to the present invention includes:

a) a first main quadrupole unit for passing parent ions of a predetermined mass/charge ratio;

b) a second main quadrupole unit accommodated in a collision chamber containing a collision gas for dissociating the ions that have passed the first main quadrupole unit into daughter ions;

c) a third main quadrupole unit for passing daughter ions of a predetermined mass/charge ratio;

d) a first pre-rod quadrupole unit provided for the first main quadrupole unit;

e) a second pre-rod quadrupole unit provided for the third main quadrupole unit;

f) a driver circuit provided for each of the first to the third main quadrupole units and the first and the second pre-rod quadrupole units, where each of the driver circuits includes a high frequency voltage generator; and g) a reference frequency source for providing the high frequency voltage generators of all the driver circuits with a common signal of a preset frequency.

The driver circuit for the first main quadrupole unit applies a combination of the high frequency voltage and a DC voltage which is adjusted to pass object parent ions of the predetermined mass/charge (m/z) ratio. However, the stable region of the main quadrupole unit is so narrow that some of the object ions having the predetermined m/z ratio may disperse. The first pre-rod quadrupole unit for the first main quadrupole unit provides high frequency alternate electric field by means of its driver circuit so that the electric field connects smoothly to that of the first main quadruple unit and the ions are adequately conveyed to the narrow stable region of the first main quadrupole unit. Since the high frequency voltage generators of the first pre-rod quadrupole unit and the first main quadrupole unit use the same frequency source (the reference frequency source) in the present invention, the frequency and the phase of the alternate electric fields of the two quadrupole units match completely, whereby the ions are smoothly conveyed between them and the number of ions entering the first main quadrupole unit is maximized.

Though the first pre-rod quadrupole unit and the first main quadrupole unit use the common signal, they can be given different amplitude of the high frequency voltage and different bias DC voltage because they have independent driver circuits respectively, whereby those quadrupole units can function independently according to their purposes.

The explanation is the same for the second pre-rod quadrupole unit provided for the third main quadrupole unit. The daughter ions generated in the second main quadrupole unit through the dissociation by the collision with the collision gas are better introduced to the third main quadrupole unit owing to the second pre-rod quadrupole unit which is given high frequency voltage of the same frequency and the same phase. Thus dispersion of object ions at the boundary of quadrupole units is minimized and as many object daughter ions as possible are introduced into the ion detector, whereby sensitivity of the mass analyzer is improved.

In the above structure of the invention, another pre-rod quadrupole unit may be placed after the first main quadrupole unit (i.e., between the first main quadrupole unit and the second main quadrupole unit) besides the first pre-rod quadrupole unit placed before the first main quadrupole unit.

Another feature of the MS/MS type mass analyzer according to the present invention includes:

a) a first main quadrupole unit for passing parent ions of a predetermined mass/charge ratio;

b) a second main quadrupole unit accommodated in a collision chamber containing a collision gas for dissociating the ions that have passed the first main quadrupole unit into daughter ions;

c) a third main quadrupole unit for passing daughter ions of a predetermined mass/charge ratio;

d) a first and a second pre-rod quadrupole units placed between the first main quadrupole unit and the second main quadrupole unit;

e) a third and fourth pre-rod quadrupole units placed between the second main quadrupole unit and the third main quadrupole unit;

f) a driver circuit provided for each of the first to the third quadrupole units and the first to the fourth pre-rod quadrupole units, each of the driver circuits including a high frequency voltage generator; and g) a reference frequency source for providing the high frequency voltage generators of all the driver circuits with a common signal of a preset frequency.

The working manner of this feature is similar to that described above, and the details are described as the second embodiment that follow.

DETAILED DESCRIPTION OF PREFERRED EMBODIMENTS

Figure 1:
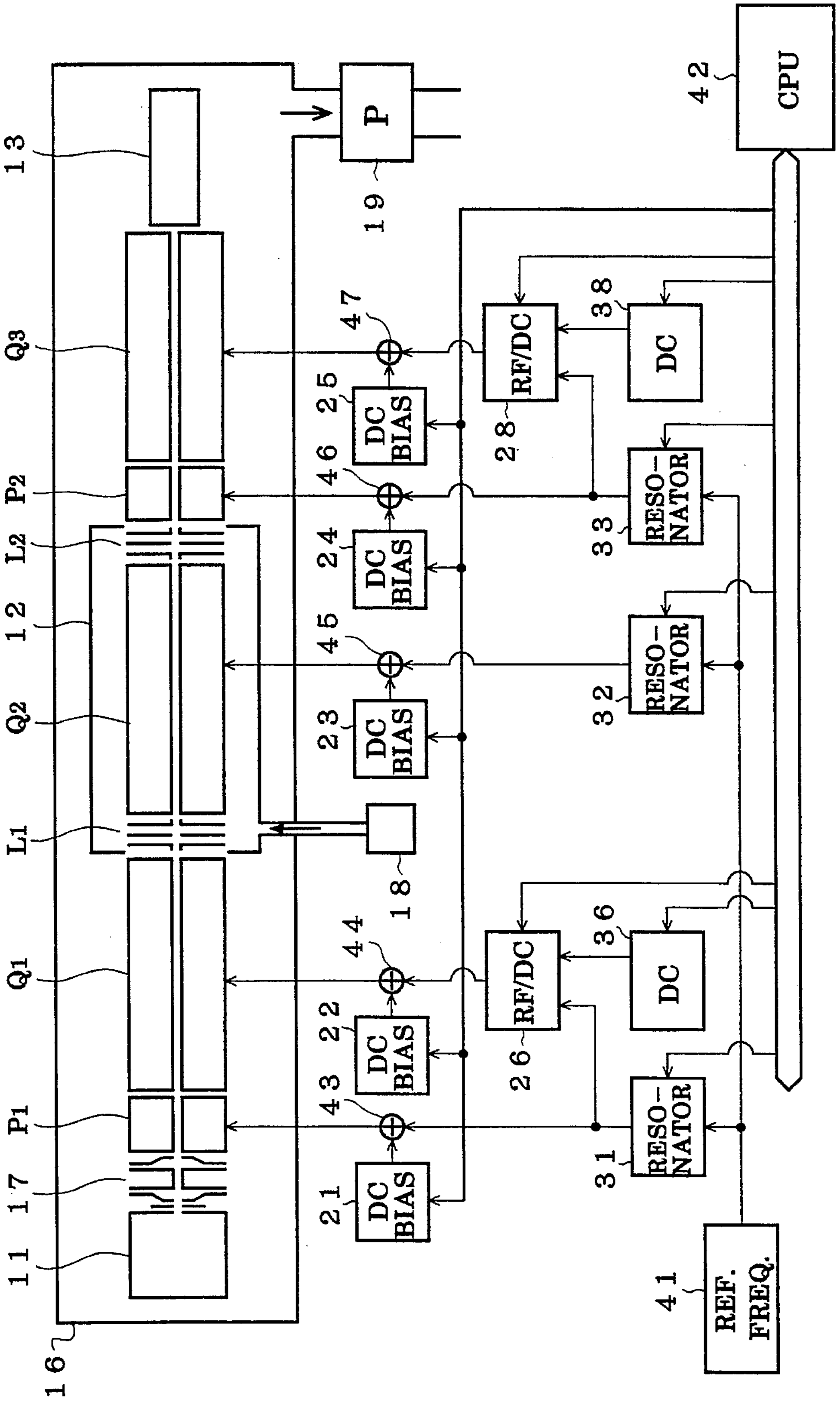
FIG. 1 is a schematic view of an MS/MS type mass analyzer and block diagram of its driver circuits according to the first embodiment of the present invention.

An MS/MS type mass analyzer is now described using FIG. 1 as the first embodiment of the present invention. Besides the first, second and third main quadrupole units $Q_1$, $Q_2$ and $Q_3$ provided to normal MS/MS type mass analyzers, the mass analyzer of the first embodiment is furnished with a first pre-rod QP (quadrupole) unit $P_1$ before the first main quadrupole unit $Q_1$ and with a second pre-rod QP unit $P_2$ before the third main quadrupole unit $Q_3$. Further, a driver circuit is provided for each of the five quadrupole units, i.e., the three main quadrupole units $Q_1$, $Q_2$, $Q_3$ plus the two pre-rod QP units $P_1$, $P_2$.

The driver circuits are constructed as follows. For the first and third main quadrupole units $Q_1$ and $Q_3$, each of the driver circuits includes: a resonator 31, 33 for generating a radio frequency RF (or a high frequency) voltage which is changed to scan the filtered mass/charge ratio (which may be referred simply as "mass" hereinafter); a scanning DC generator 36, 38 for generating a scanning DC voltage changed also to scan the filtered mass; an RF/DC combining circuit 26, 28 for combining the RF voltage and the scanning DC voltage; a bias DC generator 22, 25 for generating a bias DC voltage; and an adder 44, 47 for adding the RF/DC voltage generated in the RF/DC combiner 26, 28 and the bias DC voltage generated in the bias DC generator 22, 25. For the second main quadrupole unit $Q_2$, the driver circuit only includes a resonator 32, a bias DC generator 23 and an adder 45. Thus merely the RF voltage and the bias DC voltage are applied to the second main quadrupole unit $Q_2$. For the first and the second pre-rod QP units $P_1$ and $P_2$, similarly, each of the driver circuits includes: a bias DC generator 21, 24; a resonator 31, 33 which is commonly used with the driver circuit for the first or third main quadrupole units $Q_1$ and $Q_3$; and an adder 43, 46 for adding the bias DC voltage and the RF voltage. It is possible to provide separate resonators for the first and second pre-rod QP units $P_1$ and $P_2$.

The resonators 31, 32, 33, the scanning DC generators 36, 38 and the bias DC generators 21, 22, 23, 24, 25 are connected to a CPU 42 via a bus line, on which control signals are sent for setting the magnitude, frequency and other parameters of the voltage generated in those circuits.

To the three resonators 31, 32, 33 is commonly given a reference frequency signal of 1.2 MHz (RF frequency) from a reference frequency source 41. If separate resonators are provided for the first and second pre-rod QP units $P_1$ and $P_2$, the reference frequency signal is also given to those resonators. Further, as described above, the resonators 31 and 33 are commonly used for the main quadrupole units $Q_1$, $Q_3$ and the corresponding pre-rod QP units $P_1$, $P_2$. Thus the frequency and the phase of the RF voltage given to the first to third main quadrupole units $Q_1$–$Q_3$ and the two pre-rod QP units $P_1$, $P_2$ are always kept exactly the same (as described above, the amplitude of the RF voltage can be set by the CPU 42 at arbitrary values depending on the purpose of the units). The ions generated in the ion source 11 and introduced into the first pre-rod QP unit $P_1$ by an ion lens 17 then pass through: the first pre-rod QP unit $P_1$; the first main quadrupole unit $Q_1$ (where parent ions of a predetermined mass are filtered out); the second main quadrupole unit $Q_2$ (where the parent ions are dissociated); the second pre-rod QP unit $P_2$; and the third main quadrupole unit $Q_3$ (where daughter ions of another predetermined mass are filtered out), under an almost continuously formed RF electric field. That is, dispersion of ions at the boundary of adjacent quadrupole units due to a discrepancy in the frequency or phase of the RF voltage is minimized, and more ions are detected by the ion detector 13 so that the sensitivity of the mass analyzer is improved.

In the MS/MS type mass analyzer of the first embodiment, further, three gate type (i.e., composed of three holed electrode plates) ion lenses $L_1$ and $L_2$ are provided before and after the second main quadrupole unit $Q_2$. The two ion lenses $L_1$ and $L_2$ are connected to respectively provided driver circuits (not shown in the drawing), which are also controlled by the CPU 42 to give appropriate bias DC voltages to the ion lenses $L_1$ and $L_2$. The configuration minimizes the leak of the collision gas (which is supplied from a collision gas source 18) from the collision chamber 12 to the outside vacuum chamber 16 where high vacuum is needed to prevent dispersion of object ions. By minimizing the leak, the capacity of the vacuum pump 19 for the vacuum chamber 16 can be reduced.

Figure 2:
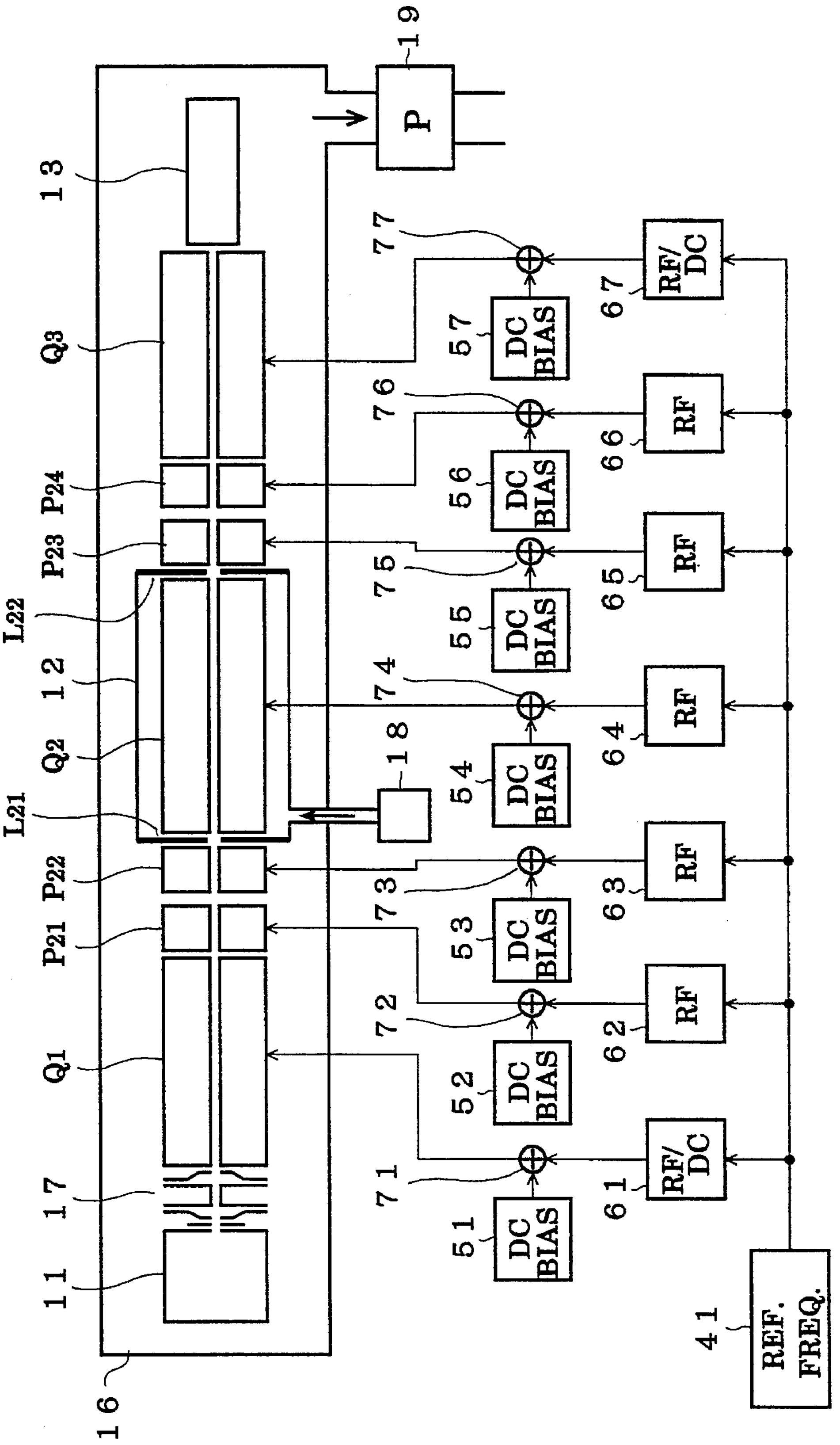
FIG. 2 is a schematic view of another MS/MS type mass analyzer and block diagram of its driver circuits according to the second embodiment of the present invention.
Figure 3:
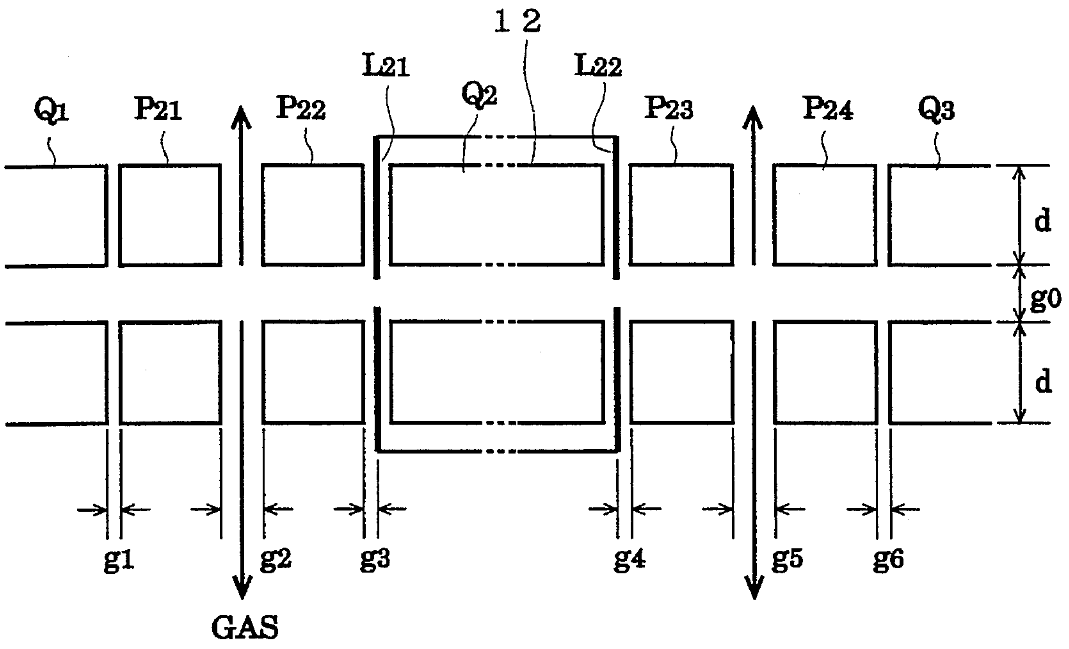
FIG. 3 is an enlarged view of the MS/MS type mass analyzer of the second embodiment.
Figure 4:
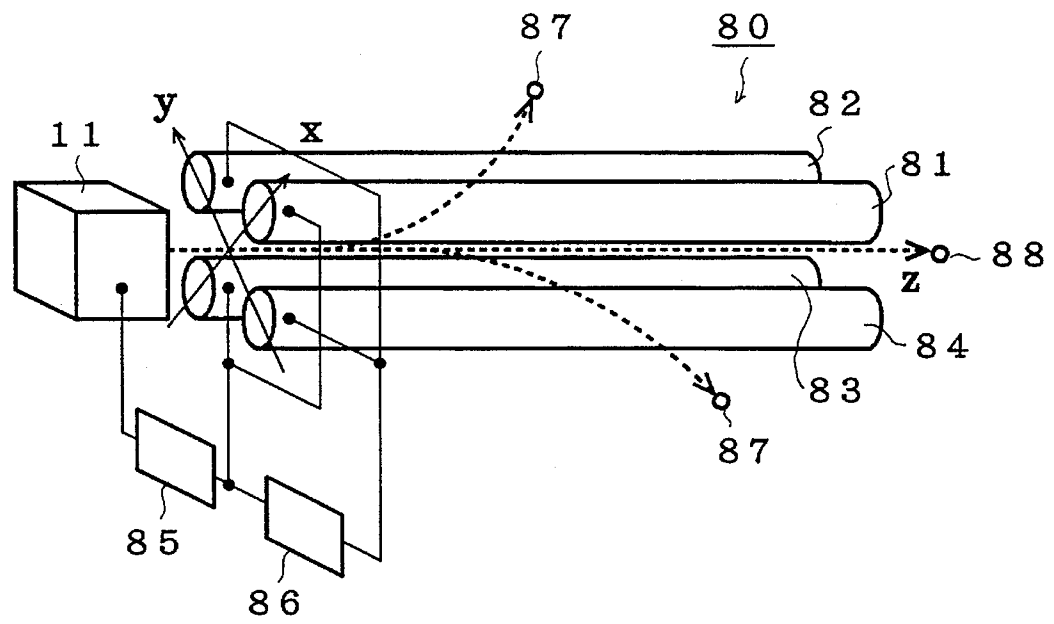
FIG. 4 is a perspective view of a quadrupole unit.
Figure 5:
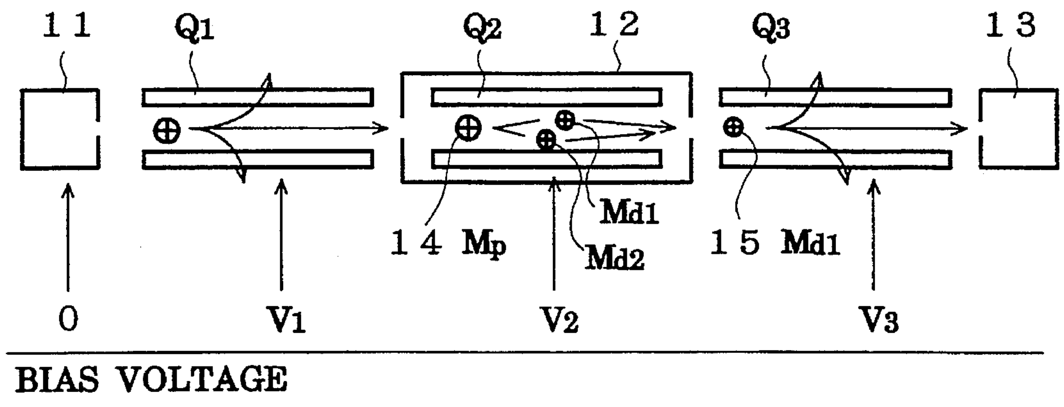
FIG. 5 is a schematic view of an MS/MS type mass analyzer using three quadrupole units.

The second embodiment of the present invention is then described using FIGS. 2 and 3. The MS/MS type mass analyzer of the present embodiment does not use the three gate type ion lenses $L_1$ and $L_2$ as in the first embodiment (FIG. 1), but uses single gate type ion lenses $L_{21}$ and $L_{22}$ before and after the second main quadrupole unit $Q_2$. Actually, in the present embodiment, the end walls of the collision chamber 12 function as the single gate type ion lenses $L_{21}$ and $L_{22}$. Further, in the present embodiment, two pre-rod QP units ($P_{21}$, $P_{22}$) are placed between the first main quadrupole unit $Q_1$ and the first ion lens $L_{21}$, and further two pre-rod QP units ($P_{23}$, $P_{24}$) are placed between the second ion lens $L_{22}$ and the third main quadrupole unit $Q_3$.

The precise arrangement of the pre-rod QP units $P_{21}$, $P_{22}$, $P_{23}$ and $P_{24}$ is shown in FIG. 3. The gap $g_1$ between the first main quadrupole unit $Q_1$ and the first pre-rod QP unit $P_{21}$, and the gap $g_3$ between the second pre-rod QP unit $P_2$ and the second main quadrupole unit $Q_2$ are set very small while the gap $g_2$ between the first and second pre-rod QP units $P_{21}$ and $P_{22}$ is set rather large. An example of the dimensions is that the gaps $g_1$ and $g_3$ are set at about 0.1 mm and the gap $g_2$ is set at about 3 mm when the diameter d of the rod electrodes of the quadrupole units $Q_1$, $P_{21}$, etc. is 12 mm and the gap $g_0$ between the rods is set at 5 mm. The gaps $g_4$, $g_5$ and $g_6$ between the second ion lens $L_1$, third pre-rod QP unit $P_{23}$, fourth pre-rod unit $P_{24}$ and third main quadrupole unit $Q_3$ are similarly arranged.

As in the first embodiment, only the RF voltage and the bias DC voltage are applied to the four pre-rod QP units $P_{21}$, $P_{22}$, $P_{23}$ and $P_{24}$, and all the quadrupole units $Q_1$, $Q_2$, $Q_3$, $P_{21}$, $P_{22}$, $P_{23}$, $P_{24}$ are given the RF voltage of the same frequency and the same phase which originates from the common reference frequency source 41. The set of a resonator, a DC voltage generator and an RF/DC combiner is represented by a simple box RF/DC 61 or 67 in FIG. 2, and the RF/DC units 61, 67, resonators 6–66, and bias DC generators 51–57 are connected and controlled by the CPU 42 as shown in FIG. 1 but not shown in FIG. 2 for diagrammatical simplicity.

The first and second pre-rod QP units $P_{21}$ and $P_{22}$ provided between the first main quadrupole unit $Q_1$ and the second main quadrupole unit $Q_2$ function as a rough ion lens by adjusting the bias DC voltage to converge the parent ions to an appropriate direction. Since the gaps $g_1$, $g_3$ between the main quadrupole units $Q_1$, $Q_2$ and the pre-rod QP units $P_{21}$, $P_{22}$ are set very small as described above, the leak of the electric field in the axial direction due to the DC component of the RF/DC voltage applied to the main quadrupole units is minimized. And the RF voltage of the same frequency and the same phase is applied to the first main quadrupole unit $Q_1$, first pre-rod QP unit $P_{21}$, second pre-rod pq unit $P_{22}$ and the second main quadrupole unit $Q_2$ (though the scanning RF/DC voltage, RF voltage and bias DC voltage are independently given to respective quadrupole units $Q_1$, $P_{21}$, $P_{22}$, $Q_2$). Thus the ions can go through the first main quadrupole unit $Q_1$ and the second main quadrupole unit $Q_2$ smoothly, whereby the dispersion is minimized and as many object ions as possible are detected by the ion detector 13. This improves the sensitivity of the mass analyzer.

The rather large gap $g_2$ between the first pre-rod QP unit $P_{21}$ and the second pre-rod QP unit $P_{22}$ facilitates evacuation of the collision gas (which leaks out of the collision chamber 12) before the gas impedes the flight of object ions in the running path of the first main quadrupole unit $Q_1$, as shown in FIG. 3. This enables to use vacuum pump 19 of a smaller capacity for the vacuum chamber 16.

The pre-rod QP units $P_{23}$ and $P_{24}$ provided between the second main quadrupole unit $Q_2$ and the third main quadrupole unit $Q_3$ work just the same as described above for the first and second pre-rod QP units $P_{21}$ and $P_{22}$. That is, they help to provide a larger amount of daughter ions generated in the second main quadrupole unit $Q_2$ to the third main quadrupole unit $Q_3$, and improve the sensitivity of the mass analyzer.

What is claimed is:

1. An MS/MS type mass analyzer comprising:

a) a first main quadrupole unit for passing parent ions of a predetermined mass/charge ratio;

b) a second main quadrupole unit accommodated in a collision chamber containing a collision gas for dissociating the ions that have passed the first main quadrupole unit into daughter ions;

c) a third main quadrupole unit for passing daughter ions of a predetermined mass/charge ratio;

d) a first pre-rod quadrupole unit provided for the first main quadrupole unit;

e) a second pre-rod quadrupole unit provided for the third main quadrupole unit;

f) a driver circuit provided for each of the first, the second and the third main quadrupole units and the first and the second pre-rod quadrupole units, each of the driver circuits including a high frequency voltage generator; and g) a reference frequency source for providing the high frequency voltage generators of all the driver circuits with a common signal of a preset frequency.

2. The MS/MS type mass analyzer according to claim 1, wherein the first pre-rod quadrupole unit is placed before the first main quadrupole unit, and the second pre-rod quadrupole unit is placed before the third main quadrupole unit.

3. The MS/MS type mass analyzer according to claim 1, wherein all the high frequency voltage generators are connected to a CPU provided for the mass analyzer and the amplitudes of high frequency voltages generated by the high frequency voltage generators are controlled by the CPU while the frequency and the phase of the high frequency voltages is uniquely determined by the common signal.

4. An MS/MS type mass analyzer comprising:

a) a first main quadrupole unit for passing parent ions of a predetermined mass/charge ratio;

b) a second main quadrupole unit accommodated in a collision chamber containing a collision gas for dissociating the ions that have passed the first main quadrupole unit into daughter ions;

c) a third main quadrupole unit for passing daughter ions of a predetermined mass/charge ratio;

d) a first and a second pre-rod quadrupole units placed between the first main quadrupole unit and the second main quadrupole unit;

e) a third and fourth pre-rod quadrupole units placed between the second main quadrupole unit and the third main quadrupole unit;

f) a driver circuit provided for each of the first, the second and the third main quadrupole units and the first, the second, the third and the fourth pre-rod quadrupole units, each of the driver circuits including a high frequency voltage generator; and g) a reference frequency source for providing the high frequency voltage generators of all the driver circuits with a common signal of a preset frequency.

5. The MS/MS type mass analyzer according to claim 4, wherein a gap between the first main quadrupole unit and the first pre-rod quadrupole unit and a gap between the second pre-rod quadrupole unit and the second main quadrupole unit are smaller than a gap between the first and the second pre-rod quadrupole units, and a gap between the second main quadrupole unit and the third pre-rod quadrupole unit and a gap between the fourth pre-rod quadrupole unit and the third main quadrupole unit are smaller than a gap between the third and the fourth pre-rod quadrupole units.

6. The MS/MS type mass analyzer according to claim 5, wherein a single gate type ion lens is used between the second pre-rod quadrupole unit and the second main quadrupole unit and between the second main quadrupole unit and the third pre-rod quadrupole unit.

7. The MS/MS type mass analyzer according to claim 6, wherein end walls of the collision chamber are used as the single gate type ion lenses.

* * * * *